United States Patent Office 3,211,775
Patented Oct. 12, 1965

3,211,775
CATALYTIC PROCESS FOR PREPARING
AROMATIC CHLOROFORMATES
Curtis Wayne Stephens and Wilfred Sweeny, Wilmington, Del., assignors to E. I. du Pont de Nemours and Company, Wilmington, Del., a corporation of Delaware
No Drawing. Filed Jan. 22, 1963, Ser. No. 253,046
7 Claims. (Cl. 260—463)

This invention relates to a novel process for preparing aromatic esters of chloroformic acid. More particularly, it relates to the preparation of such esters by the reaction of a phenolic compound with phosgene in the presence of a polymeric catalyst.

Esters of chloroformic acid, the so-called chloroformates, have been prepared for many years, and have been recognized as useful intermediates in the preparation of numerous types of organic compounds. Such chloroformates possess reactive acid chloride groupings which are capable of condensation with compositions of matter which contain active hydrogen atoms. Thus, they may be reacted with primary or secondary amines to form urethanes, with compounds which contain hydroxyl groups to form diesters of carbonic acid, and with other similar types of organic compositions which contain active hydrogen atoms.

Chloroformates are prepared by the reaction of hydroxyl-bearing organic compositions with phosgene under a variety of conditions; the aliphatic chloroformates may be formed by simply contacting the alcohol with phosgene. Aromatic chloroformates, however, have required appreciably different conditions of preparation, and the direct reaction between a phenolic compound and phosgene has not been possible. Thus, the preparation of aromatic chloroformates has been effected generally by the reaction of phosgene with the appropriate sodium phenolate, either in aqueous solution or slurried in an organic solvent. Alternatively, the preparation has been carried out by the reaction of the phenol with a solution of phosgene in the presence of a molar equivalent quantity of a tertiary amine which serves as an acceptor for the hydrogen chloride generated by the reaction. In either case, however, it is necessary to separate the desired chloroformate from its preparative medium by a procsss which is time-consuming and costly.

This invention provides a novel preparative process for aromatic chloroformates. It also provides a novel process for the direct reaction between a phenolic compound and phosgene.

The novel process permits the preparation of aromatic chloroformates by which they are produced in the absence of solvents and/or acid acceptors from the reaction of a phenolic compound with phosgene in the presence of a catalyst.

These objects are accomplished by heating a mixture of the phenolic compound, phosgene, and certain insoluble nitrogenous resins, in a closed system, thereby producing a chloroformate derivative of said phenolic compound.

More specifically, the process of this invention comprises heating under superatmospheric pressure a mixture of a phenolic compound containing one or more phenolic hydroxyl groups, and a synthetic polymeric resin containing a plurality of secondary or tertiary amino groups or their quaternary salts, said resin being in particulate form and substantially insoluble under the reaction conditions.

Among the suitable phenolic compounds which may be utilized in the preparation of the aromatic chloroformates of this invention may be named any mono-functional or polyfunctional phenols; these may, additionally, bear other nuclear substituents which are not reactive under the conditions of condensation employed. Among suitable monofunctional compositions are included phenol itself and β-naphthol; the halophenols, as o-chlorophenol, p-bromophenol, 2,5-dichlorophenol, 2,4,6-tribromophenol, and other similarly halogenated phenols; the cresols and other phenolic compounds which bear nuclear substituents of the aliphatic, cycloaliphatic, or aromatic hydrocarbon types, as e.g., 2-ethylphenol, p-cyclohexylphenol, o-hydroxydiphenyl; and other similarly substituted compositions. Among polyfunctional phenols, hydroquinone, and 2,6-dihydroxynaphthalene or their nuclearly-substituted analogs may be employed. Additionally, those dihydric or polyhydric phenols which have two or more aromatic nuclei joined by a carbon-to-carbon bond, an alkylidene group, sulfone linkage, or other small linking group may be employed. Included in this latter category are biphenol, 4,4'-methylene bisphenol, 4,4'-isopropylidine bisphenol, 4,4'-dihydroxydiphenyl sulfone, and other similar bisphenols, including their nuclearly-substituted derivatives as, e.g., 4,4'-isopropylidene-bis(2,6-dichlorophenol). Among the polyfunctional phenolic compounds, it is preferred that the difunctional substances be employed, and where two phenolic hydroxyl groups are present on the same aromatic nucleus, it is preferred that they be attached to non-adjacent carbon atoms.

By the process of this invention, the appropriate phenolic compound is reacted with phosgene in accordance with the following equation, thereby producing the desired aromatic chloroformate, i.e., the desired aromatic ester of chloroformic acid:

wherein $n$ is an integer, preferably 1 or 2 and $Ar(OH)_n$ represents a phenolic compound. As is noted from the equation, the reaction proceeds by the direct combination of the phenolic compound and phosgene. As distinct from previous preparations of aromatic chloroformates, the phenolic compound to be employed need not be in the form of its sodium salt, nor is a solvent or acid-acceptor required.

The catalytic agents suitable for the process of this invention comprise synthetic polymeric resins containing a plurality of groups of the secondary or tertiary amine type or their salts, said resins being substantially insoluble under the reaction conditions.

Typical suitable resinous catalysts for the process of this invention are the commercial nitrogenous anion exchange resins, in substantially anhydrous form. The preferred resins of this type are the cross-linked polystyrene derivatives in which the benzene ring bears a substituted aminomethyl group or a salt thereof. Preparations of these resins are described in U.S. Patents 2,591,573–4. For example, styrene is copolymerized with a minor quantity of divinylbenzene as cross-linking agent to produce small polymeric beads, followed by chloromethylation of the benzene rings and subsequent displacement of the chlorogroups by substituted amino groups in their hydrochloride or quaternary chloride salt form through reaction with a primary, secondary or tertiary amine. The resulting polymer may be washed with aqueous sodium hydroxide or other base to convert the salt to the free amine form when a primary or secondary amine has been employed. The beads comprise an insoluble polymer having a predominance of units illustrated by one of the following formulae:

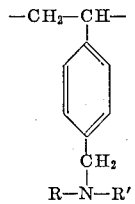 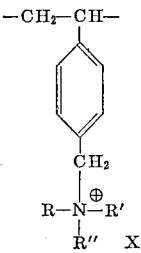 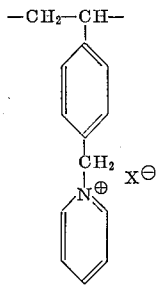

Type A   Type B   Type C wherein R represents hydrogen or a lower alkyl group of from 1-4 carbon atoms, R' represents a lower alkyl group, R" represents hydrogen or a lower alkyl or hydroxyalkyl, and X represents an anion such as the chloride ion released during transformation of the chloromethyl group.

Another suitable type of resin that may be used as the catalyst for this process is obtained by inter-condensing formaldehyde and m-phenylenediamine, followed by methylation of amine functions in the resulting insoluble polymeric resins to form N-methyl secondary and tertiary amine groups, as described in British Patents 495,032 and 495,402.

A still further suitable type of resin is illustrated by the polymeric material obtained by the inter-condensation of formaldehyde and polyethylene polyamines of the general formula $H_2N(CH_2CH_2NH)_nH$, wherein $n$ is a small integer, together with a minor quantity of melamine as the cross-linking agent, as described in British Patent 566,789.

Other suitable nitrogenous resins related to the hereinabove-mentioned types will be apparent to those skilled in the art. It is only required that said resins contain a plurality of secondary or tertiary amine groups, or their hydrochlorides, or quaternary chlorides, or other salts convertible to said hydrochlorides or chlorides under the reaction conditions; that said resins be substantially insoluble under the reaction conditions; that said resins be substantially anhydrous; and that said resins be permeable to the reactants under the reaction conditions. The required permeability is evidenced by swelling in the presence of the reactants, an increase in volume of the resin particles of between about 10% and about 200% being preferred. Generally, resins that swell at least 20% in water will have sufficient permeability in the phenolic compound/phosgene mixture.

The above-described nitrogenous resins are effective catalysts for the reaction between phosgene and phenols, thereby producing the chloroformate derivatives of said phenols. The relative quantities of catalyst, phenol, and phosgene to be employed will depend upon the desired reaction temperature, pressure, time, percent conversion and apparatus. The size of the catalyst particles is also an important factor; decreasing the particle size generally accelerates the reaction rate, the lower limit of the size being controlled primarily by the method to be used in separating the catalyst particles from the product of the reaction. For a continuous operation in which the reactant mixture is passed through a fixed porous bed of catalyst particles, the lower limit of the particle size will be controlled by factors such as the desired throughput rate, contact time, and pressure drop.

For batch-type operation wherein the reactants and catalyst form a flowable mixture that is agitated during the course of the reaction, the smallest dimension of the catalyst particles is typically between 0.01 millimeter (mm.) and 3 mm. Preferably, the particles are spherical or spheroidal in shape, and have a diameter of 0.05-0.5 mm. Continuous operation with a fixed catalyst bed will normally employ particles whose small dimension is chiefly in the range of from 0.1-2 mm.

One mole of phosgene is required for complete conversion of each gram-equivalent of phenolic hydroxyl group into the correseponding chloroformate group. In practice it is desirable to have an excess of phosgene to accelerate the reaction, and to provide more nearly complete conversion of hydroxyl to chloroformoxy. However, less than 1 mole of phosgene may be used, if incomplete conversion is desired. The ratio of molecules of phosgene to the number of phenolic hydroxyl groups may therefore be as small as 0.5 or as large as 10 or more; ratios within the range of from 1.0 to 2.0 are preferred.

Many of the resins suitable for the practice of this invention, notably the anion exchange resins, are available commercially. These are normally supplied in the form of beads saturated with water, typically 35-70% water. Because of the hydrolyzing action of water upon phosgene and chloroformates, particularly at elevated temperatures, it is desirable to remove substantially all the water from the resin before it may be used as a catalyst. This removal is accomplished by heating the resin at or below atmospheric pressure and a a temperature above the boiling point of water at that pressure, but below 150° C., preferably at 50-90° C. in vacuo.

For batch operation a quantity of resin catalyst sufficient to provide a phenolic compound:catalyst weight ratio of 0.5-30:1 may be employed; a ratio of 2-10:1 is preferred. When a low ratio is employed, a substantial portion of the chloroformate product may be absorbed within the catalyst particles, thereby swelling the resin particles and reducing the quantity of product that is readily isolated from the catalyst. However, the catalyst recovered therefrom may be re-used with the same phenolic compound without further product losses caused by such absorption. Since the nitrogen content of suitable resin catalyst will commonly be within the range of from 3-10% by weight, the permissible phenol catalyst ratio of 0.5-30:1 may also be expressed as a phenol:resinous nitrogen weight ratio of 17-1000:1.

The nitrogenous resins in the proces of this invention function as true catalysts for the preparation of aromatic chloroformates. This is demonstrated by the formation of substantially more than one molecule of chloroformate for each atom of nitrogen present in the resin, whether said resin is supplied in the free base form or as a salt such as a hydrochloride, and by the fact that substantially no chloroformate is formed when a nitrogenous resin is omitted from the reaction.

In the process of this invention a mixture of a phenolic compound, phosgene, and a nitrogenous resin of the type hereinabove defined, is heated at a temperature within the range of from 70-180° C., preferably 80-130° C. Generally heating is continued for a period of 0.2-10 hours. Operation as a batch process may be carried out by adding the phenol and resin to a suitable pressure vessel which is then sealed, cooled to below 8° C., the liquefaction point of phosgene under atmospheric pressure, and evacuated. The desired quantity of phosgene may then be condensed into the vessel, which is then sealed and heated so as to maintain the desired temperature for the desired period of time, agitation preferably being provided simultaneously. The pressure rises to an autogenous pressure in excess of one atmosphere during the reaction. At the end of the heating period the vessel is cooled and vented to release the gaseous contents, primarily hydrogen chloride and unchanged phosgene. The catalyst particles are removed from the residual material by any suitable method, such as by filtration; when the residue is solid, it may first be melted or dissolved in a suitable solvent. Following removal of the catalyst, the chloroformate product may be purified by distillation or recrystallization.

The following examples illustrate the present invention, but are not intended to limit it in any way. These examples are suitably practiced in pressure vessels made of commercial alloys that are highly resistant to the corrosive attack of hydrogen chloride, such as the high-nickel-content "Hastelloy B" or "Hastelloy C."

Example I

To a cylindrical Hastelloy pressure vessel having an internal capacity of 1000 milliliters is added 110 grams (1.0 mole) hydroquinone and about 50 g. of dried "Amberlite" IRA–400 ion-exchange resin. This resin is the strong base type, supplied commercially by the Rohm and Haas Co. as the chloride form, and is said to be a poly(p-trimethylammoniomethylstyrene chloride) modified by copolymerization with 7.5–8% divinylbenzene as a cross-linking agent to insolubilize the resin; the polymer contains predominantly the Type B repeat units $(R=R'=R''=CH_3, X=Cl)$ shown previously in the specification. The resin is previously dried at 70–80° C. overnight in a vacuum oven operated at an absolute pressure of about 100–125 millimeters mercury, and has the form of small beads having an average diameter in the dry state of about 0.35 mm. The vessel is then sealed, preferably after being flushed with nitrogen, evacuated, and cooled to below −40° C. with a Dry-Ice bath. Phosgene (220 g., 2.22 moles) is then distilled into the vessel, which is then closed, mounted in a rocker assembly, and heated at 110° C. for 8 hours while being oscillated to provide intermixing of the reactants. The vessel is then cooled to approximately room temperature, and vented to the atmosphere. The residual material is a dry, non-sticky mixture of substantially white crystals and resin beads.

The p-phenylene bischloroformate, which is soluble in hot hexane, is then separated from the resin and minor quantities of unchanged hydroquinone, which are insoluble in hot hexane, by trituration with three portions of boiling hexane. The first extraction utilizes about 2 liters of hexane, the second about 1 liter, and the third about 0.5 liter. The combined extracts are evaporated to dryness on a steam bath and then dried in a vacuum oven overnight at room temperature. There results 206 g. (0.88 mole, 88% conversion) of substantially pure p-phenylene bischloroformate, melting point about 98° C. The hexane-insoluble material weighs 55.7 g., and chiefly comprises the catalyst beads.

Example II

Example I is repeated, except that the catalyst consists of 10 g. of the hexane-insoluble beads recovered therefrom. The crude product removed from the vessel weighs 231 g.; from this the hexane extraction procedure provides 189 g. (81% conversion) of a virtually colorless crystalline product substantially identical with the p-phenylene bischloroformate obtained in Example I.

Example III

Using the procedure of Example I, a mixture of 114 g. (0.50 mole) 2,2 - bis(4 - hydroxyphenyl)propane, also known as bisphenol A, 10 g. of the hexane-insoluble beads recovered from Example I, and 110 g. (1.1 moles) phosgene is heated at 110° C. for 8 hours. The hexane extraction procedure affords 150.1 g. (86% conversion) of partially crystalline material comprising 2,2-bis(4-chloroformoxyphenyl) propane. Recrystallization from hexane provides substantially pure material having a melting point of about 94° C.

Example IV

The Example I procedure is utilized in effecting a reaction between 110 g. (1.0 mole) resorcinol and 250 g. (2.52 moles) phosgene admixed with 50 g. dried "Amberlite" IRA–400 beads. The mixture is heated at 110° C. for 8 hours, cooled and vented, a partially crystalline colored product remaining. Extraction of this product with hot hexane provides 42.7 g. of material, which is then distilled in vacuo; substantially pure m-phenylene bischloroformate (21.7 g.) is thereby obtained as an oil that rapidly solidifies to a non-sticky crystalline mass.

Repetition of this procedure at 90° C., using 38 g. of dry "Amberlite" IRA–400, provides 26.3 g. of material following evaporation of the hexane extract.

Example V

A mixture of 200 g. (0.503 mole) 2,2-bis(3,5-dichloro-4-hydroxyphenyl)propane, 250 g. (2.53 moles) phosgene, and 20 g. vacuum-dried "Amberlite" IRA–400 ion-exchange resin (chloride form) is heated in a sealed vessel at 140° C. for 8 hours. After the vessel is cooled to below 70° C., the gases are allowed to escape, and the vessel is subjected to water aspirator vacuum. The residual material is extracted with boiling hexane and filtered hot to remove the resin catalyst. By concentrating and cooling the hexane solution, 105 g. of a substantially colorless crystalline product comprising 2,2-bis(3,5-dichloro-4-chloroformoxyphenyl) propane is obtained; this product melts at about 153–158° C., which is characteristic of a mixture of about 6% of the unchanged bisphenol starting material and 94% of the pure chloroformate of this bisphenol. A mixture of this product and pure bischloroformate melts at 155–160° C. Analytical determination of the chloride ions released by alkaline hydrolysis in ethanol at room temperature indicates an acyl chlorine content in the product of 13.8%, equivalent to a 95.5% conversion of the hydroxyl groups in the phenolic starting material into chloroformoxy groups.

Example VI

A series of hydroquinone/phosgene reactions is carried with several types of nitrogenous resin. The procedure used in each reaction is that of Example I, utilizing 110 g. (1.0 mole) hydroquinone, 40 g. dried resin, and 220 g. (2.22 moles) phosgene. Each mixture is heated at 110° C. for 8 hours. After cooling and venting, the residual solid product mixture is removed from the vessel and triturated with 2 liters of boiling hexane. The extract is filtered, and the remaining insoluble material is triturated with a second 2 liter quantity of boiling hexane, which is then filtered. The two filtrates are combined and evaporated to dryness of isolate the solid p-phenylene bischloroformate, the weight of the thereby obtained solid being shown in the second column of the table below, which summarizes the results obtained with the several catalysts.

| Catalyst | Product Isolated (grams) | Percent Conversion |
| --- | --- | --- |
| 1 | 179.6 | 77 |
| 2 | 194.0 | 83 |
| 3 | 178.0 | 76 |
| 4 | 200.2 | 85 |
| 5 | 175.8 | 75 |
| 6 | 173.5 | 74 |

The catalysts shown in the above table as 1–6 are commercial anion-exchange resins having the following identities:

(1) A strong base type resin sold by the Fisher Scientific Co. as "Rexyn" AG–1, similar in structure to "Amberlite" IRA–400, except that a part of the chloride ions is replaced by the equivalent quantity of sulfate ions.

(2) A strong base type sold as "Rexyn" AG–4, a pyridinium chloride derivative of crosslinked polystyrene, having a predominance of type C units wherein $X^-$ is a mixture of $Cl^-$ and $SO_4^=$.

(3) A strong base type available commercially as "Rexyn" CG–1, having essentially the same structure as "Amberlite" IRA–400.

(4) A weak base type known as "Rexyn" CG–3, sold in the free base form, having the type A structure wherein R=H and R'=CH₃ in a fraction of the polymer units, the balance having R=R'=CH₃.
(5) A weak base type known as "Rexyn" CG-8, supplied in the hydrochloride form, having the type B structure with R=H, R'=R''=CH₃, and X=Cl.
(6) A strong base type sold as "Amberlite" IRA-410, containing a predominance of the type B units wherein —R and R' are CH₃, —R'' is CH₂CH₂OH, and X is Cl.

*Example VII*

Using the procedure of Example I, a mixture of 188.2 g. (2.0 moles) phenol, 30 g. dried "Amberlite" XE-168 anion exchange resin, and 300 g. (3.03 moles) phosgene is heated at 100° C. for 8 hours. This resin is supplied in bead form, contains tertiary amine groups, and is made by the process of U.S. Patent 2,675,359. The resin therefore, has the general structure of a divinylbenzene-crosslinked polyacrylamide, wherein most of the amidic nitrogen atoms are substituted by dialkylaminoalkyl groups. After the vessel has cooled, it is vented, and the liquid residue is filtered to remove the catalyst particles. The filtrate is fractionally distilled under reduced pressure, phenyl chloroformate being obtained as a liquid boiling at about 95° C. at 20 mm.

*Example VIII*

The general procedure of the preceding example is utilized with a mixture of 188.2 g. (2.0 moles) phenol, 25 g. dried "Amberlite" IR-4B anion-exchange resin, and 220 g. (2.20 moles) phosgene. The resin is a cross-linked polycondensate made from phenol, formaldehyde, and a polyamine by the process of U.S. Patent 2,402,384, and contains secondary amine groups. The mixture is heated at 120° C. for 6 hours and then rectified in the usual manner, a quantity of p-phenyl chloroformate being obtained by means of fractional distillation.

The process of this invention may be practiced as a continuous operation, as well as by the batch-type techniques described hereinabove. For example, the phenolic compound, particulate resinous catalytic agent and phosgene may be simultaneously and continuously introduced in suitable proportions into a series of one or more closed vessels provided with temperature control and stirring means. A portion of the mixture is continuously drawn off at such a rate as to maintain a substantially constant quantity of material within the vessel(s). The material withdrawn is rectified to isolate the chloroformate product, remove the by-product hydrogen chloride, and return the catalyst and unchanged reactants to the reaction vessel. A preferred method of continuous operation is to utilize a porous fixed catalyst bed of dried resin particles, suitably held within a closed tubular vessel, through which a mixture of phenol and phosgene is passed at a temperature of 80–150° C. and residence time of 0.2–2 hours. The effluent is rectified to isolate the chloroformate product and return the unchanged reactants to the vessel inlet.

When high-melting phenols that are not liquid under the reaction conditions are used in the process of this invention, an inert solvent may be added to the reactant mixture to dissolve the phenol. Suitable inert solvents comprise hydrocarbons bearing non-reactive polar groups, and include chlorobenzene, the dichlorobenzenes, methylene chloride, chloroform, and nitrobenzene.

The novel process of this invention provides a simple low-cost method for converting phenolic compounds into their corresponding chloroformates. Removal of the catalyst from the reaction mixture is effected very simply by filtration or centrifugation, and the chloroformate product is readily separated from the filtrate in a high state of purity by distillation or crystallization. When high quality dihydric phenols are employed, the resulting bischloroformates are of sufficient purity, when separated from unchanged dihydric phenol, for direct use in the preparation of high molecular weight condensation polymers.

The chloroformates obtained by the process of this invention may be utilized as chemical intermediates in many applications, particularly in reactions with active hydrogen compounds. The carbamate obtained from 2,4,6-trichlorophenyl chloroformate and dimethylamine is reported in U.S. Patent 2,854,374 to be useful as an insecticide. Thermoplastic polycarbonates may be made by the reaction between equimolar quantities of a bischloroformate and a bisphenol, as disclosed in U.S. Patents 2,028,365 and 3,036,036. The polyurethane prepared from piperazine and the bischloroformate of 2,2-bis-(4-hydroxyphenyl)propane is shown in U.S. Patent 2,731,445 to be useful in making a strong fiber.

What is claimed is:
1. A process for preparing an aromatic ester of chloroformic acid which consists essentially of reacting at an elevated temperature of between about 70° and 180° C. and at superatmospheric pressure, phosgene with a phenol that is free of other nuclear substituents that are reactive under the conditions of condensation employed, in the presence of a synthetic polymeric resin catalyst containing as the functional portion thereof a plurality of groups selected from the class consisting of secondary and tertiary amino groups and the salts thereof, the said resins being insoluble under the reaction conditions, and being present in a quantity to provide a phenolic compound to resin catalyst weight ratio of from about 0.5 to 30 parts of phenolic compound per part of resin catalyst.

2. The process of claim 1 wherein the phenol employed bears two hydroxyl groups.

3. The process of claim 1 wherein the elevated temperature is maintained for a period of from about 0.2 to about 10 hours.

4. A process for preparing p-phenylene bischloroformate which consists essentially of reacting at an elevated temperature of between about 70° and 180° C. and at superatmospheric pressure, phosgene with hydroquinone in the presence of a synthetic, polymeric resin catalyst containing as the functional portion thereof a plurality of groups selected from the class consisting of secondary and tertiary amino groups and the salts thereof, the said resins being insoluble under the reaction conditions, and being present in a quantity to provide a phenolic compound to resin catalyst weight ratio of from about 0.5 to 30 parts of phenolic compound per part of resin catalyst.

5. A process for preparing 2,2-bis(4-chloroformoxyphenyl)propane which consists essentially of reacting at an elevated temperature of between about 70° and 180° C. and at superatmospheric pressure, 2,2-bis(4-hydroxyphenyl)propane with phosgene in the presence of a synthetic polymeric resin catalyst containing as the functional portion thereof a plurality of groups selected from the class consisting of secondary and tertiary amino groups and the salts thereof, the said resins being insoluble under the reaction conditions, and being present in a quantity to provide a phenolic compound to resin catalyst weight ratio of from about 0.5 to 30 parts of phenolic compound per part of resin catalyst.

6. A process for preparing m-phenylene bischloroformate which consists essentially of reacting at an elevated temperature of between about 70° and 180° C. and at superatmospheric pressure, phosgene with resorcinol in the presence of a synthetic, polymeric resin catalyst containing as the functional portion thereof a plurality of groups selected from the class consisting of secondary and tertiary amino groups and the salts thereof, the said resins being insoluble under the reaction conditions, and being present in a quantity to provide a phenolic compound to resin catalyst weight ratio of from about 0.5 to 30 parts of phenolic compound per part of resin catalyst.

7. A process for preparing 2,2-bis(3,5-dichloro-4- chloroformoxyphenyl)propane which consists essentially of reacting at an elevated temperature of between about 70° and 180° C. and at superatmospheric pressure, phosgene with 2,2-bis(3,5-dichloro-4-hydroxyphenyl) propane in the presence of a synthetic polymeric resin catalyst containing as the functional portion thereof a plurality of groups selected from the class consisting of secondary and tertiary amino groups and the salts thereof, the said resins being insoluble under the reaction conditions, and being present in a quantity to provide a phenolic compound to resin catalyst weight ratio of from about 0.5 to 30 parts of phenolic compound per part of resin catalyst.

References Cited by the Examiner

UNITED STATES PATENTS 2,591,573 4/52 McBurney _____ 260—2.1

OTHER REFERENCES

Kunin, Ion Exchange Resins, 2nd Ed., pp. 258–9 (1958).

Wagner and Zook, Synthetic Organic Chemistry, pp. 483–4 (1953).

CHARLES B. PARKER, *Primary Examiner.*